Patented Aug. 20, 1946

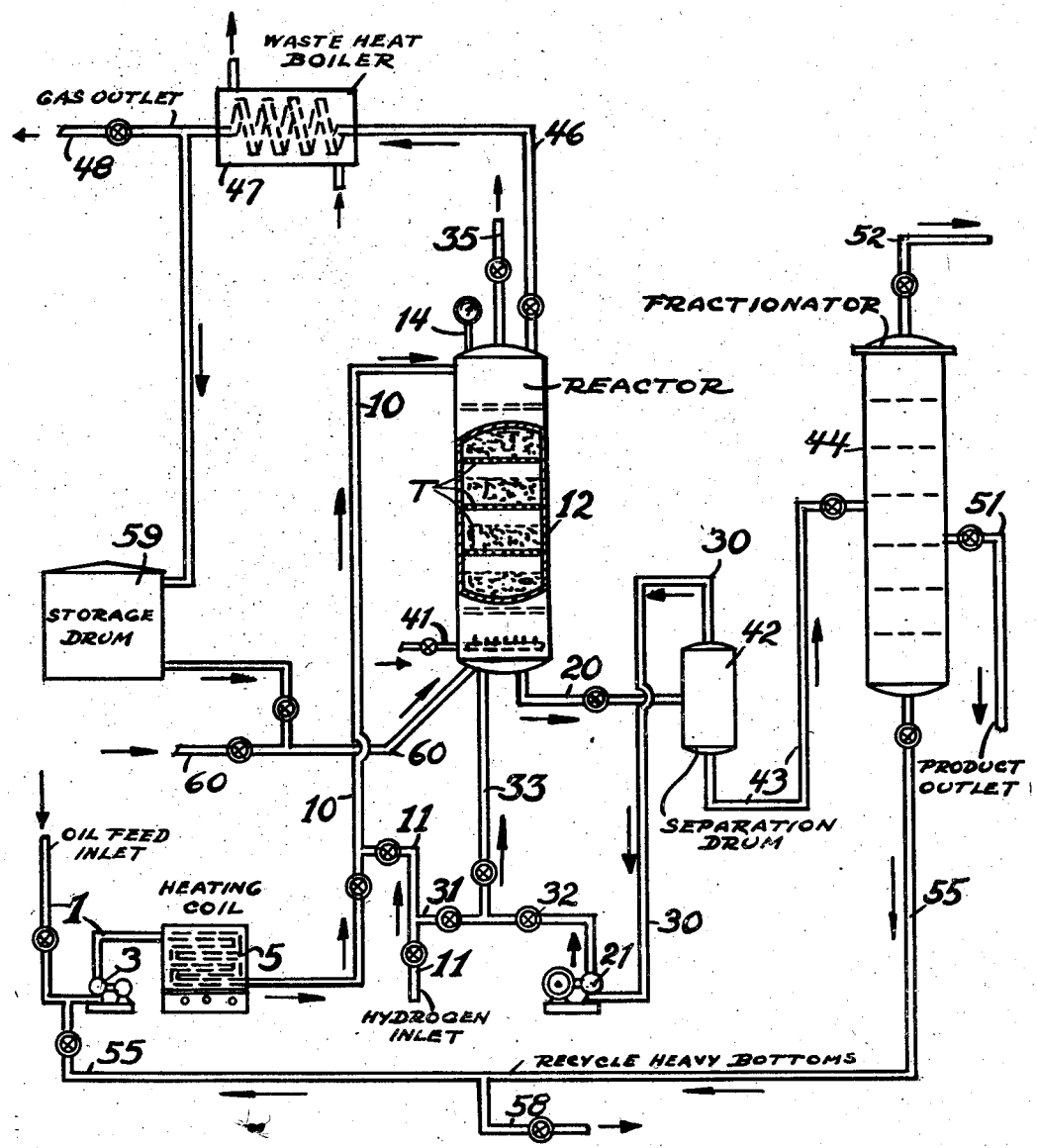

2,406,117

UNITED STATES PATENT OFFICE 2,406,117

REFORMING

Albert B. Welty, Jr., Mountainside, N. J., assignor to Standard Oil Development Company, a corporation of Delaware Application October 2, 1943, Serial No. 504,661

9 Claims. (Cl. 260—668)

This application is a continuation-in-part of my copending application Serial No. 458,920, filed September 19, 1942, entitled "Method of manufacturing petroleum products."

The present invention relates to improvements in the art of improving hydrocarbon oils, and more particularly, it relates to improvements in the regeneration of catalysts employed in the so-called reforming of naphthas and gasoline to convert a charging stock into an automotive fuel or aviation fuel of improved octane rating or for manufacture of some special product such as toluene.

It is a matter of record that gasoline, whether virgin or cracked, may be improved by reforming either thermally or catalytically. During the reforming operation, the oil is heated to temperatures of from say 800° F. to 1100° F., but preferably within the range of from 980° F. to 1050° F. and preferably discharged into a reactor containing a catalyst and also added hydrogen, which reactor is preferably operated under superatmospheric pressure, whereupon the charging stock undergoes conversion. When operating at its best, this reforming operation results in a minimum of cracking of the charging stock, and the principal reaction is preferably one of dehydrogenation accompanied by cyclization and isomerization. The product withdrawn from the reactor and fractionated will be found to have been improved in octane rating. Thus a virgin naphtha having a very low octane number, say of the order of 45 ASTM, may be improved as much as 35 to 45 octane numbers by an operation of the character described. Under certain conditions of operation the octane rating of virgin fractions may be improved by reforming to yield a product having an octane number of over 85. Obviously this reformed product will make an excellent automotive fuel and, more than that, it may when blended with an alkylate product and tetraethyl lead added yield an aviation fuel having an octane number of 100 or better depending of course on the quality of the alkylate added and the octane number of the base fuel.

As hereinbefore indicated, however, this present invention is directed towards regeneration of the catalysts used in the reforming operation, and in brief compass the invention resides in the concept of reducing the pressure imposed on the catalyst after regeneration, purging the catalyst with the hydrogen or hydrogen-containing gas at say atmospheric pressure, and then repressuring the zone containing the catalyst for the commencement of the next reforming operation. It will be understood of course that during the reforming reaction tarry and coky deposits are formed on the catalyst and there comes a time when it is necessary to discontinue the reforming operation in order to remove the deposits. The removal of the deposits is most conveniently accomplished by forcing an oxygen-containing gas, such as air or air diluted with flue gas, through the bed of catalyst at elevated temperatures and pressures, whereupon the said deposits are consumed by combustion.

The main object of the present invention therefore is to improve the operation of a reforming process conducted in the presence of a catalyst and added hydrogen.

A specific object of the present invention is to improved the operation of the catalyst during the catalytic reforming of naphthas and gasoline so as to increase the yield of desirable products such as toluene.

Other and further objects of my invention will appear from the following more detailed description and claims.

In the accompanying drawing, I have shown diagrammatically a flow plan which illustrates a preferred embodiment of my invention.

My invention will be best understood by referring to the drawing in connection with the ensuing description. Referring therefore in detail to the drawing, a charging stock such as a 200° F. to 250° F. boiling range virgin naphtha fraction, preferably from a naphthenic crude, is discharged into the system through line 1 and then pumped by pump 3 into a fired coil or other suitable heating device 5 where the oil is heated to a temperature somewhat above 950° F., say from 980° F. to 1050° F., thence is withdrawn through line 10, and thence discharged into a reactor 12 containing catalyst disposed on a plurality of spaced foraminous trays T. The catalyst may be, for example, an oxide of a II, V, or VI group metal supported on a suitable base, such as Activated Alumina, magnesia, silica or the like. I prefer, however, to employ molybdenum oxide supported on Activated Alumina, the amount of molybdenum oxide being about 10% by weight, the balance being the Activated Alumina support. The amount of molybdenum oxide may vary from 5% to 20% by weight of the total composition. I may use also with good results, chromium oxide. However, I may use any of the known reforming catalysts.

Just prior to the introduction of the vapors into reactor 12 they are mixed with hydrogen or a hydrogen-containing gas derived from a subsequent stage of this process as will subsequently appear, or from some extraneous source. This hydrogen is discharged from line 11 into line 10 and thereafter with the oil into reactor 12, the amount of hydrogen employed being from 1000 to 4000 cubic feet of hydrogen per barrel of liquid oil. It is pointed out that in reactor 12 I maintain a pressure preferably of the order of from 150 to 400 lbs. per square inch. It should also be noted that in the type of operation contemplated, the catalyst is in the form of pills, pellets, extruded lengths, granules, and the like and is supported on the trays T, which trays have foraminous bases. The oil is fed to the reactor at a rate of say from 0.5 to 2 volumes of oil per volume of catalyst per hour on a cold oil basis.

Under the conditions stated, the feed stock undergoes transformation of the character indicated, and the product is withdrawn through line 20 and discharged into a separation drum 42 from which normally gaseous hydrocarbons and hydrogen are recovered overhead through line 30 and recycled to line 11 for further use in the process. While it does not form an important phase of the present invention, it may be and often is desirable to remove the hydrocarbons contained in recycled stream 30 in whole or in part so that the hydrogen will be more pure as it enters line 11. This may be accomplished in any known manner in equipment not illustrated, for example, the gas in line 30 could be scrubbed with a narrow-boiling kerosene fraction to preferentially absorb the hydrocarbons and the hydrogen recycled to 12 would be substantially pure.

The bottoms from separation drum 42 are withdrawn through line 43 and discharged into a fractionator 44 from which fractionator the product is recovered as a side stream through line 51. An overhead fraction containing hydrogen and light hydrocarbons is recovered through line 52 and this product may be processed to recover hydrogen in means not shown; for example, it may be scrubbed with kerosene or other scrubbing agent to remove a substantial portion of the hydrocarbons whereby the hydrogen is enriched and is rendered suitable for recycling to reactor 12. The hydrocarbons themselves may be stripped from the solvent and dehydrogenated to form olefins and diolefins which may be used as intermediates for the production of aviation gasoline or rubber substitutes.

A bottoms fraction is recovered through line 55 and recycled to the inlet side of pump 3 for further use in the process. A portion of these heavy bottoms may be withdrawn through line 58 and rejected from the system.

In the foregoing description, I have outlined for the purpose of clarity a procedure generally employed in reforming a naphtha in the presence of hydrogen and a suitable catalyst so that my specific improvements regarding regeneration of the catalyst will be better understood. As indicated, the reforming operation, in spite of the fact that it was conducted in the presence of hydrogen, tends to progressively build up contaminants on the catalyst in reactor 12. These contaminants impair the activity of the catalyst and make it necessary to discontinue the reforming operation to purify the catalyst. This may be accomplished by burning off the contaminants. It will be understood that in order to maintain continuity of overall operation it is preferable to provide two or more reactors 12 so that while the catalyst in one or more reactors is undergoing regeneration, the on-stream process may be carried out in one or more of the others.

Another method for maintaining continuity of operation is to inject into the vapors in line 10 a powdered catalyst to form a suspension which is forced through a reaction zone, which suspension will then pass through a separator usually located outside the reactor to separate the catalyst from the reaction products. The separated catalyst may be regenerated in a regeneration zone and returned continuously to the reaction zone in the form of active catalyst, thus maintaining continuity of operation, but my process is primarily concerned with the stationary bed type of operation described above employing one or more reactors containing spaced beds of pilled catalyst or a continuous bed of catalyst. As previously indicated, the pressure imposed on the reactants in 12 as indicated in pressure gauge 14 would be considerably elevated and may be as much as 400 lbs. per square inch, although lower pressures, such as 190 lbs. per square inch, are often used during the reforming operation.

Specifically describing my improvements in regenerating a catalyst, the following procedure is employed. First, the oil supply is discontinued and in so doing, I close valve 31 in line 11 and open valve 32 in line 30 and discharge through the reactor the hydrogen and/or recycle gas (containing hydrogen) in order to purge out of the catalyst all of the volatilizable oils, that is to say, the catalyst being an adsorptive substance adsorbs normally liquid oils, or at least readily vaporizable hydrocarbons and these are removed by flowing the recycled gas upwardly through line 33 through the reactor for a period of about 15 minutes. The off gases from the operation are withdrawn through line 35 and they may be sent to an absorption zone (not shown) to recover normally liquid products therefrom, and thereafter the hydrogen purified of hydrocarbons is recycled to line 11. Following the purging operation, I close valve 32 in line 30, and I next inject an inert gas, such as nitrogen or flue gas, via line 60, in the reactor to purge the hydrogen from the reactor. The purging gas used for displacing hydrogen from the reactor is preferably a portion of the spent regeneration gas, or rather the exit gases from a previous regeneration collected at the beginning of said regeneration in a storage drum 59, and contains less than 6% oxygen and preferably less than 2% free oxygen. The catalyst is treated with this inert gas, whether it be nitrogen or spent regeneration gas, for a period of about 15 minutes. Both the hydrogen purge and the inert flue gas purge are conducted at about the same pressure as used during the productive phase of reforming. The reactor following these purgings is substantially free of volatile hydrocarbons and hydrogen and is ready to be treated with an oxygen-containing gas to burn off the fixed carbon contaminating the catalyst.

The oxygen-containing gas, which may be air, is discharged into the reactor through line 41 located at the bottom of said reactor and flows upwardly therethrough where it contacts the catalyst and causes combustion of the contaminants. This regeneration is carried out at pressures of the same order and of the same range as those employed during the reforming. The oxygen-containing gas entering through line 41 preferably may be heated to a temperature of say 600° F. to 700° F. as it enters the reactor, and at this temperature it will upon contact with the catalyst, which is ordinarily at a temperature around 900°

F., cause the combustion of the fixed carbon or tarry or coky deposits on the catalyst, and the flue gases or the combustion products resulting from this operation are withdrawn through line 46. The gas in line 46 may be at a temperature of about 1000° F. or higher, and this gas may be discharged into a waste heat boiler to recover a portion of its sensible heat. Thus the gas may be discharged into a waste heat boiler 47 and thence into storage 59, particularly at the beginning of the regeneration when its oxygen content is low. Later towards the end of the regeneration period when the oxygen concentration is greater the exhausted regeneration gases issuing from boiler 47 may be rejected from the system through line 48. Then, according to my present invention the following special purging procedure is followed: First, after discontinuing the air supply I purge the catalyst with inert gas such as flue gas, $N_2$, $CO_2$ or the fumes from a previous regeneration, etc., from line 60, then, discontinue this purging, and reduce the pressure to about atmospheric. The above inert purging requires about six minutes. The next step is to purge the catalyst with hydrogen or hydrogen-containing gas from lines 30 and 33 at atmospheric pressure for a period of about 30 minutes. The next step is to flow hydrogen-containing gas into the reactor for a period of about 8 minutes while increasing the pressure up to operating pressure. Following this latter step, the catalyst is ready for the productive operation.

Using the foregoing procedure, the yield of toluene was increased from 52% to 62% over the older method in which during the purging with the inert gas and the hydrogen gas a pressure of 250 lbs. per square inch was maintained within the reactor, so that these data show the advantage of depressuring with inert gas, purging with hydrogen at a reduced pressure, say around atmospheric, and then repressuring with hydrogen-containing gas. Thus, in a run in which a molybdenum oxide catalyst was employed in manufacturing toluene from methylcyclohexane, improvements in yield obtained by purging the catalyst according to the foregoing method are set forth in the table below:

| Pressure of purge with inert gas and hydrogen | Atmospheric | | 250 lbs./sq. in. | |
|---|---|---|---|---|
| Temp. of purge, °F | 700 | 1,000 | 700 | 1,000 |
| Toluene yield, vol. per cent based on methylcyclohexane in feed | 72 | 63 | 62 | 54 |

It will be noted from the immediately preceding example that the yields were greatly increased by purging under reduced pressure, that is to say, pressure of the order of atmospheric and contrasting with pressure used in producing the toluene product which, in the example given, was about 250 lbs. per square inch. Instead of operating at atmospheric pressure during purging, I may obtain improved results where the pressure during purging with inert gas and hydrogen following regeneration is subatmospheric, or the pressure may extend up to around 50 lbs. per square inch, but as indicated I prefer to operate at pressures around 1 atmosphere. Additional improvement accrues from use of as low temperature as possible at the time recycle gas (i. e. hydrogen-containing), is introduced. This temperature in practice, however, is generally determined by other factors.

By way of illustration, the specific case of a molybdenum oxide on alumina catalyst is discussed below. An analogous treatment applies to other catalysts that may be used such as chromium oxide on alumina, although, of course, the values employed will be different.

The amount of gas used in the recycle hydrogen-containing gas purge while at low pressure should be somewhat more than an amount equivalent to that required to reduce the molybdenum trioxide in the catalyst to molybdenum dioxide. Thus, for a catalyst of 50 lbs. per cu. ft. density containing 8% by weight molybdenum trioxide I may determine the minimum amount of recycle hydrogen-containing gas of, say, 60% (by volume) hydrogen content that should be employed before increasing the pressure for the reaction period, as follows:

50# catalyst/cu. ft. catalyst × 8# $MoO_3$/100# catalyst × 380 cu. ft. hydrogen/144# $MoO_3$ × 100 cu. ft. recycle gas/60 cu. ft. hydrogen = 17.6 cu. ft. of recycle gas/cu. ft. of catalyst.

In this case, then, somewhat more than 17.6 cu. ft. of recycle gas per cubic foot of catalyst should be passed through the bed before the pressure is raised. Another indication of the time when pressure may be raised is to be had in the analysis of the exit gas from the reactor being purged. During the time of the reduction of the molybdenum trioxide to the dioxide hydrogen will be almost completely consumed and less than five per cent will appear in the reactor exit gas. As soon as this reduction has been accomplished in the entire reactor bed, however, hydrogen will begin to appear in large quantities in the exit gas. At this point, pressure may be increased. The presence of hydrogen may be detected by means of an automatic density recorder or other suitable known means.

Although it has been indicated that in the case of a molybdena on alumina catalyst the amount of hydrogen required is about equivalent to that for reduction of the trioxide to the dioxide, it is not to be inferred that the reduction is this simple and that reduction to some specific form such as the dioxide necessarily always occurs. On the contrary, I have evidence that the trioxide can be reduced to a greater or less degree depending upon the method of preparation of the catalyst and the amount of use it has seen. Furthermore, the oxide obtained in reduction ordinarily corresponds to no simple formula.

To recapitulate therefore, my present invention is directed toward improving a catalytic hydroforming operation, that is to say, an operation in which a feed stock is essentially dehydrogenated, although other reactions may take place as, for example, where methylcyclohexane or some other cyclic paraffin is dehydrogenated to the corresponding aromatic, in which operation, during purging of the catalyst with hydrogen-containing gas after regeneration and purging with inert gas, the pressure in the reactor is reduced to around atmospheric, although higher or lower pressures may be employed, providing always that the pressure during the said hydrogen purging is substantially lower than during the productive operation.

Although my description has included specific data on toluene production from methylcyclohexane-rich stocks, it will be understood that improved results are obtained in any reforming operation whether the feed stock be a more or less pure compound or whether it be a naphtha such as a cracked or virgin naphtha.

Numerous modifications of my invention falling within the spirit thereof may be made by those familiar with this art.

What I claim is:

1. The method of reforming a hydrocarbon in the presence of a catalyst which consists essentially of a reducible metal oxide of group VI of the periodic system carried on an alumina-containing base and added free hydrogen in which operation the reaction takes place under superatmospheric pressure and which operation requires periodic regeneration of the catalyst, the improvement which comprises subjecting the catayslt after regeneration to a purging operation with free hydrogen or free hydrogen-containing gas carried out at pressures substantially less than those employed during the said reforming operation.

2. The method set forth in claim 1 in which the purging operation with free hydrogen-containing gas is carried out at substantially atmospheric pressure.

3. The method set forth in claim 1 in which a feed stock containing methylcyclohexane is subjected to reforming conditions to produce toluene.

4. The method of producing toluene from a hydrocarbon fraction containing methylcyclohexane which comprises contacting the said feed stock with a reforming catalyst consisting essentially of a reducible metal oxide selected from the class consisting of molybdenum oxide and chromium oxide carried on an alumina support, in the presence of added free hydrogen and under reforming conditions of temperature and pressure, withdrawing reaction products, discontinuing the flow of feed stock to the catalyst, regenerating the catalyst, purging with inert gas and prior to returning the feed stock to the catalyst, purging the said catalyst with a free hydrogen-containing gas at pressures substantially below those employed during the reforming operation.

5. The method set forth in claim 4 in which catalyst is purged with a flue gas at pressures prevailing during the reforming operation and thereafter purged with a free hydrogen-containing gas at pressures not substantially exceeding about 1 atmosphere gauge pressure.

6. The method set forth in claim 4 in which following the purging with inert gas the pressure imposed on the catalyst is reduced to about atmospheric within a space of from about 5 to 15 minutes.

7. In the method of reforming a normally liquid hydrocarbon oil containing naphthenic components under superatmospheric pressure and elevated temperatures and in the presence of added free hydrogen and a reforming catalyst consisting essentially of a reducible metal oxide selected from the class consisting of molybdenum oxide and chromium oxide carried on an alumina support, the improvement which comprises purging the catalyst following the necessary regeneration of said catalyst with a free hydrogen-containing gas at pressures not exceeding about 50 lbs. per square inch gauge pressure until such time as hydrogen appears in large quantities in the exit gas.

8. The method set forth in claim 4 in which following purging with a free hydrogen-containing gas at reduced pressures the system is repressured with a gas containing hydrogen.

9. In the process of catalytic reforming of hydrocarbon distillates in the presence of free hydrogen under superatmospheric pressure in which the catalyst consisting essentially of a reducible metal oxide selected from the class consisting of molybdenum oxide and chromium oxide carried on an alumina support, is gradually deactivated by a formation of carbonaceous deposits thereon, the steps of regenerating the catalyst for reuse which comprises purging the catalyst of oil vapor by directing a current of free hydrogen therethrough, purging the catalyst of hydrogen by passing therethrough a current of inert gas, removing carbonaceous deposits from the catalyst by oxidation with a gas containing free oxygen, purging the catalyst of oxygen by passing a stream of inert gas therethrough, passing the stream of hydrogen through the catalyst and maintaining a low pressure below that employed in the hydroforming operation, then building pressure with hydrogen to the level employed for hydroforming and thereafter again recommencing the feed of oil and hydrogen for the hydroforming step.

ALBERT B. WELTY, Jr.

Disclaimer 2,406,117.—*Albert B. Welty, Jr.*, Mountainside, N. J. REFORMING. Patent dated Aug. 20, 1946. Disclaimer filed Apr. 15, 1949, by the assignee, *Standard Oil Development Company*.

Hereby disclaims from claims 1, 2, 3, 4, 8, and 9, and each of them, any process of the type defined in which the step of purging the catalyst with free hydrogen or free hydrogen-containing gas is not continued until hydrogen begins to appear in large quantities in the exit gas.

[*Official Gazette, May 17, 1949.*]